US011875462B2

(12) United States Patent
Wang et al.

(10) Patent No.: US 11,875,462 B2
(45) Date of Patent: Jan. 16, 2024

(54) SYSTEMS FOR AUGMENTED REALITY AUTHORING OF REMOTE ENVIRONMENTS

(71) Applicant: Adobe Inc., San Jose, CA (US)

(72) Inventors: Zeyu Wang, New Haven, CT (US); Paul J. Asente, Redwood City, CA (US); Cuong D. Nguyen, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 1 day.

(21) Appl. No.: 16/951,531

(22) Filed: Nov. 18, 2020

(65) Prior Publication Data
US 2022/0157024 A1 May 19, 2022

(51) Int. Cl.
G06T 19/00 (2011.01)
(52) U.S. Cl.
CPC .................. G06T 19/006 (2013.01)
(58) Field of Classification Search
CPC .................. G06T 19/006; G06T 15/04; H04N 2201/3253; H04N 2201/3254
See application file for complete search history.

(56) References Cited

U.S. PATENT DOCUMENTS

| 8,217,957 | B1* | 7/2012 | Isaacson | G06T 17/05 |
| | | | | 345/428 |
| 10,748,302 | B1* | 8/2020 | Dine | G06T 19/00 |
| 10,762,712 | B2* | 9/2020 | Valli | G06T 19/006 |

| 2017/0142480 | A1* | 5/2017 | Gupta | H04N 21/458 |
| 2018/0033208 | A1* | 2/2018 | Martin | H04N 1/00244 |
| 2018/0101978 | A1* | 4/2018 | Hirota | G06T 15/04 |

(Continued)

FOREIGN PATENT DOCUMENTS

| CN | 102521869 B | * 12/2013 | |
| CN | 107615338 A | * 1/2018 | G06T 15/04 |

(Continued)

OTHER PUBLICATIONS

"Adobe Aero", Adobe Website [retrieved Jan. 21, 2021]. Retrieved from the Internet <https://www.adobe.com/products/aero.html>., Jun. 5, 2018, 11 pages.

(Continued)

Primary Examiner — Chante E Harrison
(74) Attorney, Agent, or Firm — FIG. 1 Patents

(57) ABSTRACT

In implementations of systems for augmented reality authoring of remote environments, a computing device implements an augmented reality authoring system to display a three-dimensional representation of a remote physical environment on a display device based on orientations of an image capture device. The three-dimensional representation of the remote physical environment is generated from a three-dimensional mesh representing a geometry of the remote physical environment and digital video frames depicting portions of the remote physical environment. The augmented reality authoring system receives input data describing a request to display a digital video frame of the digital video frames. A particular digital video frame of the digital video frames is determined based on an orientation of the image capture device relative to the three-dimensional mesh. The augmented reality authoring system displays the particular digital video frame on the display device.

20 Claims, 12 Drawing Sheets

(56) References Cited

U.S. PATENT DOCUMENTS

| | | | |
|---|---|---|---|
| 2018/0218538 A1* | 8/2018 | Short | G02B 27/017 |
| 2018/0316877 A1* | 11/2018 | Gruenke | G06T 7/73 |
| 2018/0374276 A1* | 12/2018 | Powers | G06T 19/20 |
| 2019/0369836 A1* | 12/2019 | Faulkner | G06F 3/04845 |
| 2019/0371060 A1* | 12/2019 | Energin | G06T 17/05 |
| 2020/0111255 A1* | 4/2020 | Brodsky | G06T 19/006 |
| 2021/0067840 A1* | 3/2021 | Mate | G06T 19/006 |
| 2021/0097768 A1* | 4/2021 | Malia | G06F 3/0488 |
| 2021/0312887 A1* | 10/2021 | Griswold | G06F 21/6218 |

FOREIGN PATENT DOCUMENTS

| | | | |
|---|---|---|---|
| JP | 2021082928 A * | 5/2021 | |
| WO | WO-2018167465 A1 * | 9/2018 | G06T 3/4038 |

OTHER PUBLICATIONS

"ARKit", Apple Developer Website [retrieved Jan. 21, 2021]. Retrieved from the Internet <https://developer.apple.com/documentation/arkit>., 2018, 6 pages.

"Reality Composer", Apple Developer Website [retrieved Jan. 21, 2021]. Retrieved from the Internet <https://developer.apple.com/augmented-reality/tools/>., 2019, 4 pages.

"RealityKit", Apple Developer Website [retrieved Feb. 10, 2021]. Retrieved from the Internet <https://developer.apple.com/documentation/realitykit>., 2019, 4 pages.

"SceneKit", Apple Developer Website [retrieved Feb. 10, 2021]. Retrieved from the Internet <https://developer.apple.com/documentation/scenekit>., 2014, 5 pages.

"Spark AR Studio", Spark AR Website, Facebook, Inc. [retrieved Feb. 11, 2021]. Retrieved from the Internet <https://sparkar.facebook.com/ar-studio/>., 2019, 8 pages.

"Three.js", three.js Website [retrieved Feb. 10, 2021]. Retrieved from the Internet <https://threejs.org/>., 2010, 5 pages.

"Unity", Unity Technologies [retrieved Feb. 12, 2021]. Retrieved from the Internet <https://unity.com/>., 2020, 12 pages.

Adelson, E.H. , "Pyramid Methods in Image Processing", RCA engineer 29, No. 6 [retrieved Apr. 23, 2008]. Retrieved from the Internet <http://web.mit.edu/persci/people/adelson/pub_pdfs/RCA84.pdf>., Nov. 1984, 9 Pages.

Alexander, Jeremiah , "Wiarframe", wiarframe, Inc. [retrieved Sep. 13, 2020 via Internet Archive]. Retrieved from the Internet <https://web.archive.org/web/20200913054307/https://www.wiarframe.com/>., Nov. 2017, 6 pages.

Ashtari, Narges et al., "Creating Augmented and Virtual Reality Applications: Current Practices, Challenges, and Opportunities", CHI '20: Proceedings of the 2020 CHI Conference on Human Factors in Computing Systems [retrieved Feb. 10, 2021]. Retrieved from the Internet <http://hci.cs.sfu.ca/AshtariCHI2020.pdf>., Apr. 2020, 13 pages.

Brejcha, Jan et al., "Immersive Trip Reports", UIST '18: Proceedings of the 31st Annual ACM Symposium on User Interface Software and Technology [retrieved Feb. 10, 2021]. Retrieved from the Internet <http://cphoto.fit.vutbr.cz/immersive-trip-reports/data/immersive_trip_reports.pdf>., Oct. 2018, 13 pages.

Cockburn, Andy et al., "A review of overview+detail, zooming, and focus+context interfaces", ACM Computing Surveys, vol. 41, No. 1 [retrieved Feb. 11, 2021]. Retrieved from the Internet <https://www.microsoft.com/en-us/research/wp-content/uploads/2008/01/cockburn-ComputingSurveys09.pdf>., Jan. 2009, 42 pages.

Du, Ruofei et al., "DepthLab: Real-time 3D Interaction with Depth Maps for Mobile Augmented Reality", UIST '20: Proceedings of the 33rd Annual ACM Symposium on User Interface Software and Technology [retrieved Feb. 11, 2021]. Retrieved from the Internet <https://dl.acm.org/doi/pdf/10.1145/3379337.3415881>., Oct. 2020, 15 pages.

Guo, Anhong et al., "Blocks: Collaborative and Persistent Augmented Reality Experiences", Proceedings of the ACM on Interactive, Mobile, Wearable and Ubiquitous Technologies, vol. 3, No. 3 [retrieved Feb. 11, 2021]. Retrieved from the Internet <https://dl.acm.org/doi/pdf/10.1145/3351241>., Sep. 2019, 24 pages.

Guven, Sinem et al., "Mobile Augmented Reality Interaction Techniques for Authoring Situated Media On-Site", 2006 IEEE/ACM International Symposium on Mixed and Augmented Reality, Santa Barbard, CA [retrieved Feb. 11, 2021]., Retrieved from the Internet <https://www.researchgate.net/profile/Sinem_Guven/publication/221221371_Mobile_augmented_reality_interaction_techniques_for_authoring_situated_media_on-site/links/5668494508ae9da364b82922.pdf>., Oct. 2006, 3 pages, 2 pages.

Kumaravel, Balasaravanan T. et al., "Loki: Facilitating Remote Instruction of Physical Tasks Using Bi-Directional Mixed-Reality Telepresence", UIST '19: Proceedings of the 32nd Annual ACM Symposium on User Interface Software and Technology [retrieved Feb. 12, 2021]. Retrieved from the Internet <https://people.eecs.berkeley.edu/~bjoern/papers/kumaravel-loki-uist2019.pdf>., Oct. 2019, 14 pages.

Kunert, Andre et al., "Photoportals: shared references in space and time", CSCW'14: Proceedings of the 17th ACM conference on Computer supported cooperative work & social computing [retrieved Feb. 11, 2021]. Retrieved from the Internet <https://www.lri.fr/~mbl/ENS/CSCW/2012/papers/Kunert2014.pdf>., Feb. 2014, 12 pages.

Leiva, German et al., "Pronto: Rapid Augmented Reality Video Prototyping Using Sketches and Enaction", CHI '20: Proceedings of the 2020 CHI Conference on Human Factors in Computing Systems, Apr. 2020.

Li, Yuwei et al., "SweepCanvas: Sketch-based 3D Prototyping on an RGB-D Image", UIST '17: Proceedings of the 30th Annual ACM Symposium on User Interface Software and Technology [retrieved Feb. 12, 2021]., Retrieved from the Internet <https://www.researchgate.net/profile/Yuwei_Li10/publication/320574341_SweepCanvas_Sketch-based_3D_Prototyping_on_an_RGB-D_Image/links/59f843eea6fdcc075ec7e01e/SweepCanvas-Sketch-based-3D-Prototyping-on-an-RGB-D-Image.pdf>., Oct. 2017, pp. 387-399.

Lindlbauer, David et al., "Remixed Reality: Manipulating Space and Time in Augmented Reality", CHI '18: Proceedings of the 2018 CHI Conference on Human Factors in Computing Systems [retrieved Feb. 12, 2021]. Retrieved from the Internet, <https://www.researchgate.net/profile/David_Lindlbauer/publication/324659385_Remixed_Reality_Manipulating_Space_and_Time_in_Augmented_Reality/links/5b854bbf4585151fd13798ee/Remixed-Reality-Manipulating-Space-and-Time-in-Augmented-Reality.pdf>., Apr. 2018, 13 pages.

Liu, Chen et al., "PlaneRCNN: 3D Plane Detection and Reconstruction From a Single Image", 2019 IEEE/CVF Conference on Computer Vision and Pattern Recognition (CVPR) [retrieved Feb. 12, 2021]. Retrieved from the Internet, <https://openaccess.thecvf.com/content_CVPR_2019/papers/Liu_PlaneRCNN_3D_Plane_Detection_and_Reconstruction_From_a_Single_Image_CVPR_2019_paper.pdf>., Jun. 2019, 10 pages.

Liu, Feng et al., "Discovering panoramas in web videos", MM '08: Proceedings of the 16th ACM international conference on Multimedia [retrieved Feb. 12, 2021]. Retrieved from the Internet <http://pages.cs.wisc.edu/~fliu/papers/acmmm08.pdf>., Oct. 2008, 10 pages.

Macintyre, Blair et al., "DART: the Designer's Augmented Reality Toolkit", The Second IEEE and ACM International Symposium on Mixed and Augmented Reality, 2003. Proceedings., Tokyo, Japan [retrieved Feb. 12, 2021]. Retrieved from the Internet, <https://www.researchgate.net/profile/Maribeth_Gandy/publication/221221471_DART_the_Designer's_Augmented_Reality_Toolkit/links/0fcfd511d123180bfc000000/DART-the-Designers-Augmented-Reality-Toolkit.pdf>., Oct. 2003, 2 pages.

Orts-Escolano, Sergio et al., "Holoportation: Virtual 3D Teleportation in Real-time", UIST '16: Proceedings of the 29th Annual Symposium on User Interface Software and Technology [retrieved Feb. 12, 2021]., Retrieved from the Internet <https://www.researchgate.net/profile/Sean_Fanello/publication/306544236_Holoportation_Virtual_3D_Teleportation_in_Real-time/links/5ba5a649299bf13e604365bc/Holoportation-Virtual-3D-Teleportation-in-Real-time.pdf>., Oct. 2016, 14 pages.

Paczkowski, Patrick et al., "Insitu: Sketching Architectural Designs in Context", ACM Transactions on Graphics, vol. 30, No. 6 [retrieved

(56) References Cited

OTHER PUBLICATIONS

Feb. 12, 2021]. Retrieved from the Internet <http://vclab.kaist.ac.kr/siggraphasia2011/Insitu_SA2011pres.pdf>., Dec. 2011, 10 pages.
Ronacher, Armin et al., "Flask", The Pallets Projects [retrieved Feb. 12, 2021]. Retrieved from the Internet <https://flask.palletsprojects.com/en/1.1.x/>., Apr. 2010, 9 pages.
Snavely, Noah et al., "Modeling the World from Internet Photo Collections", International Journal of Computer Vision, vol. 80, Issue 2 [retrieved Feb. 12, 2021]. Retrieved from the Internet <http://phototour.cs.washington.edu/ModelingTheWorld_ijcv07.pdf>., Nov. 2008, 22 pages.
Snavely, Noah et al., "Photo Tourism: Exploring Photo Collections in 3D", SIGGRAPH '06: ACM SIGGRAPH 2006 Papers [retrieved Feb. 12, 2021]. Retrieved from the Internet <http://phototour.cs.washington.edu/Photo_Tourism.pdf>., Jul. 2006, 12 pages.
Sodhi, Rajinder S. et al., "BeThere: 3D mobile collaboration with spatial input", CHI '13: Proceedings of the SIGCHI Conference on Human Factors in Computing Systems, Apr. 2013.
Stoakley, Richard et al., "Virtual Reality on a WIM: Interactive Worlds in Miniature", CHI '95: Proceedings of the SIGCHI Conference on Human Factors in Computing Systems [retrieved Feb. 12, 2021]. Retrieved from the Internet, <https://www.ibisc.univ-evry.fr/~fdavesne/ens/ens_efrei_m1/pub/virtual_reality_on_a_wim_interactive_wo_117149.pdf>., May 1995, 8 pages.
Tecchia, Franco et al., "3D helping hands: a gesture based MR system for remote collaboration", VRCAI '12: Proceedings of the 11th ACM SIGGRAPH International Conference on Virtual-Reality Continuum and its Applications in Industry, Dec. 2012,.
Tsang, Michael et al., "Boom Chameleon: Simultaneous capture of 3D viewpoint, voice and gesture annotations on a spatially-aware display", UIST '02: Proceedings of the 15th annual ACM symposium on User interface software and technology [retrieved Feb. 12, 2021]. Retrieved from the Internet, <http://depts.washington.edu/dmgftp/publications/uist04/uist_papers/Boom%20Chameleon%20-%20Simultaneous%20capture%20of%203D%20viewpoint.pdf>., Oct. 27, 2002, 10 pages.
Wang Baldonado, Michelle Q et al., "Guidelines for using multiple views in information visualization", AVI '00: Proceedings of the working conference on Advanced visual interfaces [retrieved Feb. 12, 2021]. Retrieved from the Internet, <https://www.researchgate.net/profile/Michelle_Baldonado/publication/2635114_Guidelines_for_Using_Multiple_Views_in_Information_Visualization/links/0912f512c4063132a1000000.pdf>., May 2000, 10 pages.
You, Evan, "Vue.js The Progressive JavaScript Framework", MIT License [retrieved Feb. 12, 2021]. Retrieved from the Internet <https://vuejs.org/v2/guide/>., 2019, 11 pages.
Yue, Ya-Ting et al., "SceneCtrl: Mixed Reality Enhancement via Efficient Scene Editing", UIST '17: Proceedings of the 30th Annual ACM Symposium on User Interface Software and Technology [retrieved Feb. 12, 2021]. Retrieved from the Internet <http://yongliangyang.net/docs/sceneCtrl_uist17.pdf>., Oct. 2017, 10 pages.
Zhang, Yinda et al., "Du2Net: Learning Depth Estimation from Dual-Cameras and Dual-Pixels", arXiv Preprint, arXiv.org [retrieved Feb. 12, 2021]. Retrieved from the Internet <https://arxiv.org/pdf/2003.14299.pdf>., Mar. 31, 2020, 32 pages.

* cited by examiner

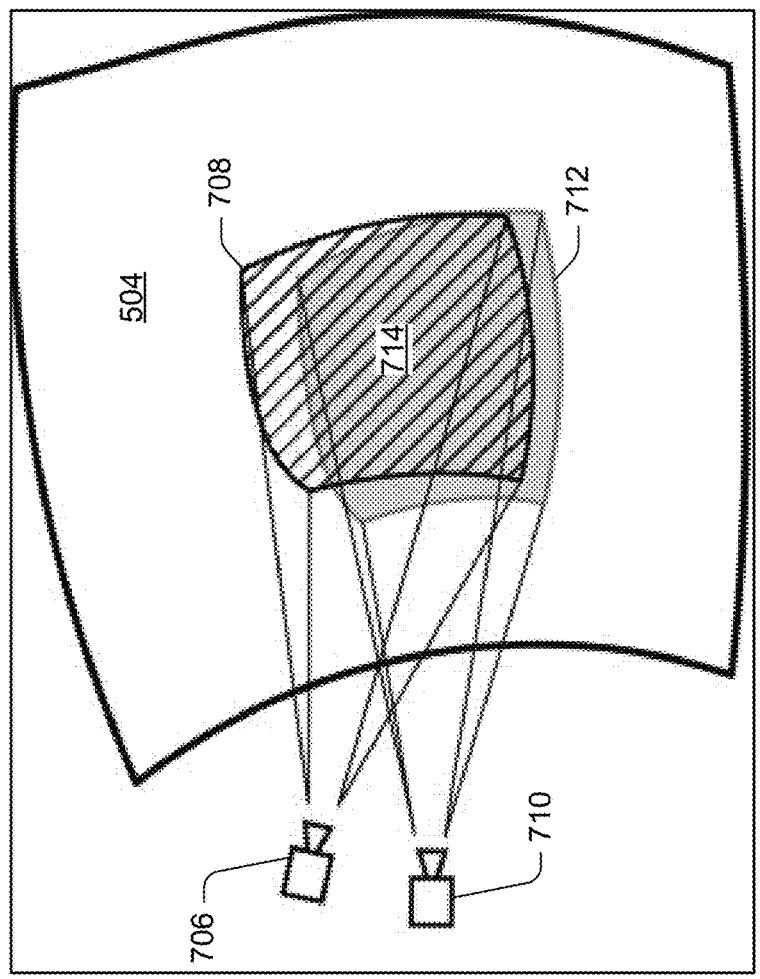

SYSTEMS FOR AUGMENTED REALITY AUTHORING OF REMOTE ENVIRONMENTS

BACKGROUND

In an augmented reality environment, a computing device renders digital content on a display device to augment a user's direct view of a physical environment. The manner in which the user's direct view of the physical environment is augmented defines an augmented reality experience and augmented reality experiences are either generic or site-specific. Generic augmented reality experiences are limited to use of simple geometric features of the physical environment such as physical walls or floors to render and display the digital content. These augmented reality experiences are generic because they are consumable in many different types of physical environments, for example, any physical environment having a physical wall or floor.

Site-specific augmented reality experiences are authored and consumed in a particular physical environment but are not limited to use of simple geometric features of the particular physical environment for rendering and displaying the digital content. Rather, site-specific augmented reality experiences are capable of leveraging all geometric features of the particular physical environment such as a size of the particular physical environment or physical objects included in the environment to display the digital content. Conventional systems for authoring a site-specific augmented reality experience require an author of the experience to be present in a same physical environment where the augmented reality experience is consumed. For example, an interior decorator is capable of using a conventional system to author a site-specific augmented reality experience in which virtual furniture is displayed relative to existing physical furniture in an apartment. In this example, an owner of the apartment consumes the site-specific augmented reality experience in the apartment to decide whether to purchase physical furniture represented by the virtual furniture. However, the interior decorator is not capable of using the conventional system to author the site-specific augmented reality experience without being physically present in the apartment to arrange the virtual furniture relative to the existing physical furniture.

SUMMARY

Techniques and systems are described for augmented reality authoring of remote environments. In an example, a computing device implements an augmented reality authoring system to display a three-dimensional representation of a remote physical environment on a display device based on orientation of an image capture device. For example, the augmented reality authoring system receives remote environment data describing a three-dimensional mesh representing a geometry of the remote physical environment, digital video frames depicting portions of the remote physical environment, and capture information of a remote image capture device in relation to the three-dimensional mesh. The three-dimensional representation of the remote physical environment is generated based on the remote environment data.

In one example, the augmented reality authoring system receives input data describing a request to display a digital video frame of the digital video frames. A particular video frame of the video frames is determined based on an orientation of the image capture device relative to the three-dimensional mesh. The augmented reality authoring system displays the particular video frame on the display device. For example, the augmented reality authoring system displays the particular video frame as a photorealistic composite on the display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 7A, 7B, and 7C illustrate an example of determining a particular digital video frame of digital video frames used to generate a three-dimensional representation of a remote physical environment for display on a display device.

DETAILED DESCRIPTION

Overview

Figure 1:
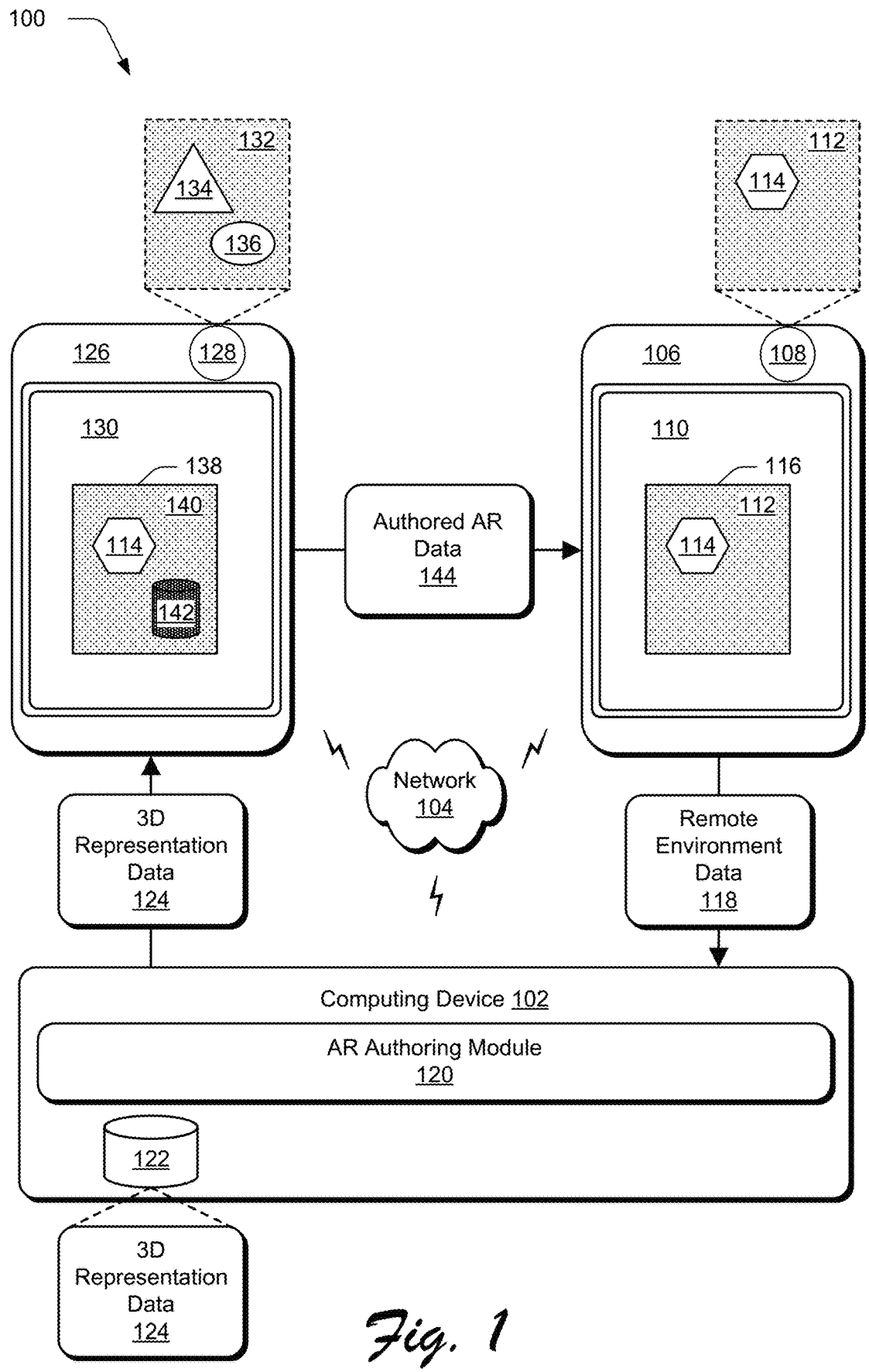
FIG. 1 is an illustration of an environment in an example implementation that is operable to employ digital systems and techniques for augmented reality authoring of remote environments as described herein.

Augmented reality experiences are either generic or site-specific. Conventional systems for authoring site-specific augmented reality experiences require an author's physical presence in a same physical environment where the augmented reality experience will be consumed. For example, if the physical environment includes physical objects, then the author must be physically present in the physical environment to identify the physical objects and arrange virtual objects relative to the physical objects.

To overcome the limitations of conventional systems, techniques and systems are described for augmented reality authoring of remote environments. In one example, a computing device implements an augmented reality authoring system to receive remote environment data describing a three-dimensional mesh representing a geometry of a remote physical environment, digital video frames depicting portions of the remote physical environment, and capture information of a remote image capture device in relation to the three-dimensional mesh. In this example, the augmented reality authoring system generates a three-dimensional representation of the remote physical environment.

For example, the augmented reality authoring system generates the three-dimensional representation by projecting the digital video frames onto the three-dimensional mesh based on the capture information of the remote image capture device. The augmented reality authoring system displays the three-dimensional representation of the remote physical environment on a display device of a client device based on orientations of an image capture device of the client device. In an example, the augmented reality authoring system receives input data describing user inputs relative to the three-dimensional representation of the remote physical environment. In this example, a user of the client devices interacts with the display device such as to indicate additions and arrangements of virtual objects in the three-dimensional representation. For example, the user of the client device authors a site-specific augmented reality experience for the remote physical environment.

In one example, the augmented reality authoring system receives input data describing a request to display a digital video frame of the digital video frames. For example, the user of the client device is considering adding a virtual object to the three-dimensional representation near a window and the user desires to customize the virtual object based on what is depicted through the window (e.g., outside of the remote physical environment) which is not included in the three-dimensional representation of the remote environment. The user of the client device interacts with the display device to indicate the request to display the digital frame.

The augmented reality authoring system determines a particular digital video frame of the digital video frames. For example, the augmented reality authoring system determines the particular digital video frame based on an orientation of the image capture device of the client device relative to the three-dimensional mesh. In this example, the augmented reality authoring system compares a portion of three-dimensional mesh covered by a viewport of the image capture device of the client device with portions of the three-dimensional mesh covered by a viewport of the remote image capture device when the digital video frames were captured.

The augmented reality authoring system determines the particular digital video frame based on the portion of three-dimensional mesh covered by the viewport of the image capture device and a portion of the three-dimensional mesh covered by the viewport of the remote image capture device when the particular digital video frame was captured. The augmented reality authoring system displays the particular digital video frame on the display device of the client device. The particular digital video frame depicts, for example, a beach front view through window in the remote physical environment. The user of the client device interacts with the display device to indicate an addition of a virtual beach ball object near the window in the three-dimensional representation of the remote physical environment.

The described systems improve conventional augmented reality authoring systems for site-specific augmented reality experiences by enabling authoring of remote site-specific augmented reality experiences which is not possible using conventional systems. Additionally, the described systems are capable of displaying digital video frames depicting a portion of a remote physical environment corresponding to a portion of the three-dimensional representation of the remote physical environment. This supports verification and validation of remote augmented reality experience authorship. The described systems are also capable of displaying complete views of the three-dimensional representation of the remote physical environment for visualization and/or navigation. In this way, the described systems facilitate augmented reality authoring of remote physical environments from physical locations which have geometric features that significantly differ from geometric features of the remote physical environments.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a remote computing device 106 that is also connected to the network 104 and is communicatively coupled to the computing device 102 via the network 104. The remote computing device 106 includes an image capture device 108 and a display device 110 which is also a user interface such as a touchscreen in one example. Although the remote computing device 106 is illustrated as including a single image capture device 108, it is to be appreciated that the image capture device 108 is representative of multiple image capture devices 108 in some examples. For example, the image capture device 108 represents a first image capture device 108 having a telephoto lens, a second image capture device 108 having a wide-angle lens, a third image capture device 108 having an ultra wide-angle lens, and so forth.

The remote computing device 106 is disposed in a remote physical environment 112 which includes a physical object 114. As shown, the remote computing device 106 captures digital video frames depicting the remote physical environment 112 and the physical object 114 using the image capture device 108 in the remote physical environment 112. The remote computing device 106 renders the captured digital video frames consecutively as a digital video 116 which is displayed on the display device 110. In one example, the remote computing device 106 also records capture data for each of the digital video frames. This capture data includes, for example, orientations and positions of the image capture device 108 as the digital video frames are captured in the remote physical environment 112.

In the illustrated example, the remote computing device 106 generates a three-dimensional representation of a geometry of the remote physical environment 112 and the physical object 114. In an example, the remote computing device 106 includes a LiDAR scanner and generates the three-dimensional representation by illuminating the remote physical environment 112 with a laser. In this example, the remote computing device 106 uses reflections of the laser to represent the geometry of the remote physical environment 112.

For example, the remote computing device 106 includes one or more sensors such as orientation sensors, acceleration sensors, position sensors, and so forth. In one example, the remote computing device 106 generates the three-dimensional representation of the geometry of the remote physical environment 112 through use of visual inertial odometry by estimating orientation and translation in response to movements of the image capture device 108 relative to the remote physical environment 112. In another example, the remote computing device 106 generates a three-dimensional mesh representing the geometry of the remote physical environment 112 and the physical object 114.

The remote computing device 106 generates remote environment data 118 as describing the digital video frames depicting portions the remote physical environment 112 and the physical object 114, the orientations and positions of the image capture device 108 as the digital video frames are captured in the remote physical environment 112, and the three-dimensional mesh representing the geometry of the remote physical environment 112 and the physical object 114. As shown, the remote computing device 106 transmits the remote environment data 118 to the computing device 102 via the network 104. The computing device 102 is illustrated to include an augmented reality authoring module 120 and a storage device 122. For example, the computing device 102 implements the augmented reality authoring module 120 to receive the remote environment data 118.

The augmented reality authoring module 120 processes the remote environment data 118 to generate three-dimensional representation data 124 which is stored on the storage device 122. To do so in one example, the augmented reality authoring module 120 generates a two-dimensional UV map such that each vertex of the three-dimensional mesh representing the geometry of the remote physical environment 112 has a corresponding UV map coordinate for texture mapping. For each of the digital video frames that depict a portion of the remote physical environment 112, the augmented reality authoring module 120 uses the corresponding orientations and positions of the image capture device 108 to generate a virtual camera directed at the three-dimensional mesh and having the same orientations and positions of the image capture device 108 when the digital video frame was captured. Then, for each of the UV map coordinates, the augmented reality authoring module 120 determines a corresponding vertex of the three-dimensional mesh. For example, the augmented reality authoring module 120 uses a coverage of three-dimensional mesh by the virtual camera to determine whether the corresponding vertices are included in the digital video frame.

If a corresponding vertex is included in the digital video frame, then the augmented reality authoring module 120 determines a color value for the UV map coordinate by bilinearly interpolating pixel colors depicted in the digital video frame in one example. In this manner, the augmented reality authoring module 120 generates a partial texture map for each digital video frame that includes colors for covered areas of the three-dimensional mesh. The augmented reality authoring module 120 then blends these partial texture maps to generate a complete texture map. In one example, the augmented reality authoring module 120 generates the complete texture map using pyramid blending such as to generate the complete texture map with smooth borders while avoiding blurring effects caused by averaging.

The augmented reality authoring module 120 uses the complete texture map to generate a three-dimensional representation of the remote physical environment 112 by projecting the two-dimensional texture map onto the three-dimensional mesh. The augmented reality authoring module 120 generates three-dimensional representation data 124 as describing the three-dimensional representation of the remote physical environment 112.

In one example, the augmented reality authoring module 120 transmits the three-dimensional representation data 124 to a client device 126. In this example, the client device 126 is also connected to the network 104 and the computing device 102 implements the augmented reality authoring module 120 to transmit the three-dimensional representation data 124 to the client device 126 via the network 104. Although the client device 126 is illustrated as being separate from the computing device 102, in some examples, the client device 126 and the computing device 102 are implemented as a single computing device.

The client device 126 includes an image capture device 128 and a display device 130 which is also a user interface in an example. The client device 126 is illustrated as including a single image capture device 128; however, the image capture device 128 is representative of multiple image capture devices 128 in some examples. In these examples, the image capture device 128 represents a first image capture device 128 having a telephoto lens, a second image capture device 128 having a wide-angle lens, a third image capture device 128 having an ultra wide-angle lens, etc.

The client device 126 is disposed in a physical environment 132 which includes a first physical object 134 and a second physical object 136. In this example, the client device 126 displays a rendering 138 of a three-dimensional representation 140, e.g., of the remote physical environment 112, on the display device 130. For example, instead of capturing digital video frames depicting the physical environment 132 using the image capture device 128, the client device 126 uses orientations of the image capture device 128 to display the three-dimensional representation 140.

Consider an example in which the client device 126 displays the three-dimensional representation 140 on the display device 130 based on movements of the client device 126 and/or orientations of the image capture device 128 within the physical environment 132. For example, the three-dimensional representation 140 includes the physical object 114 and a user of the client device 126 interacts with the client device 126 in the physical environment 132 to understand dimensions and relative placement of the physical object 114 in the remote physical environment 112 without leaving the physical environment 132 or being physically present in the remote physical environment 112. As shown, the user of the client device 126 interacts in the display device 130 which is also a user interface such as a touch screen and adds a virtual object 142 to the three-dimensional representation 140.

The client device 126 generates authored augmented reality data 144 as describing the three-dimensional representation 140 with the added virtual object 142. In one example, the client device 126 transmits the authored augmented reality data 144 to the remote computing device 106 via the network 104. In this example, the remote computing device 106 receives the authored augmented reality data 144 and processes the authored augmented reality data 144 to render the virtual object 142 on the display device 110. In this manner, a user of the remote computing device 106 interacts with the virtual object 142 in the remote physical environment 112 without leaving the remote physical environment 112 or being physically present in the physical environment 132.

Although the remote computing device 106 is described as both generating the remote environment data 118 and receiving the authored augmented reality data 144, it is to be appreciated that different computing devices are capable of generating the remote environment data 118 and/or receiving the authored augmented reality data 144. In one example, the remote computing device 106 generates the remote environment data 118 and a different computing device receives and processes the authored augmented reality data 144 such that a user of the different computing device is capable of interacting with the virtual object 142 in the remote physical environment 112. In another example, a different computing device generates the remote environment data 118 and the remote computing device 106 receives and processes the authored augmented reality data 144 such that the user of the remote computing device 106 is capable of interacting with the virtual object 142 in the remote physical environment 112.

For example, the remote physical environment 112 is a new apartment and a user of the remote computing device 106 needs to furnish the new apartment with furniture. However, in this example, the user of the remote computing device 106 has just received positive test results for a highly contagious virus. The user of the client device 126 is an expert in furnishing apartments but is also at a heightened risk of serious complications and adverse effects if the user contracts the highly contagious virus. Thus, the user of the remote computing device 106 is not able to leave the remote physical environment 112 and the user of the client device 126 is not able to enter the remote physical environment 112.

In this example, the virtual object 142 is virtual furniture which has virtual dimensions similar or identical to physical dimensions of physical furniture. The user of the client device 126 adds the virtual object 142 to the three-dimensional representation 140 and the user of the remote computing device 106 experiences the virtual object 142 in the remote physical environment 112 to evaluate a layout of physical furniture in the remote physical environment 112. By interacting with the virtual object 142 in the remote physical environment 112, the user of the remote computing device 106 determines that physical furniture corresponding to the virtual object 142 fits well within the dimensions of the remote physical environment 112. The user of the remote computing device 106 orders the physical furniture corresponding to the virtual object 142 which is shipped to the remote physical environment 112.

Figure 2:
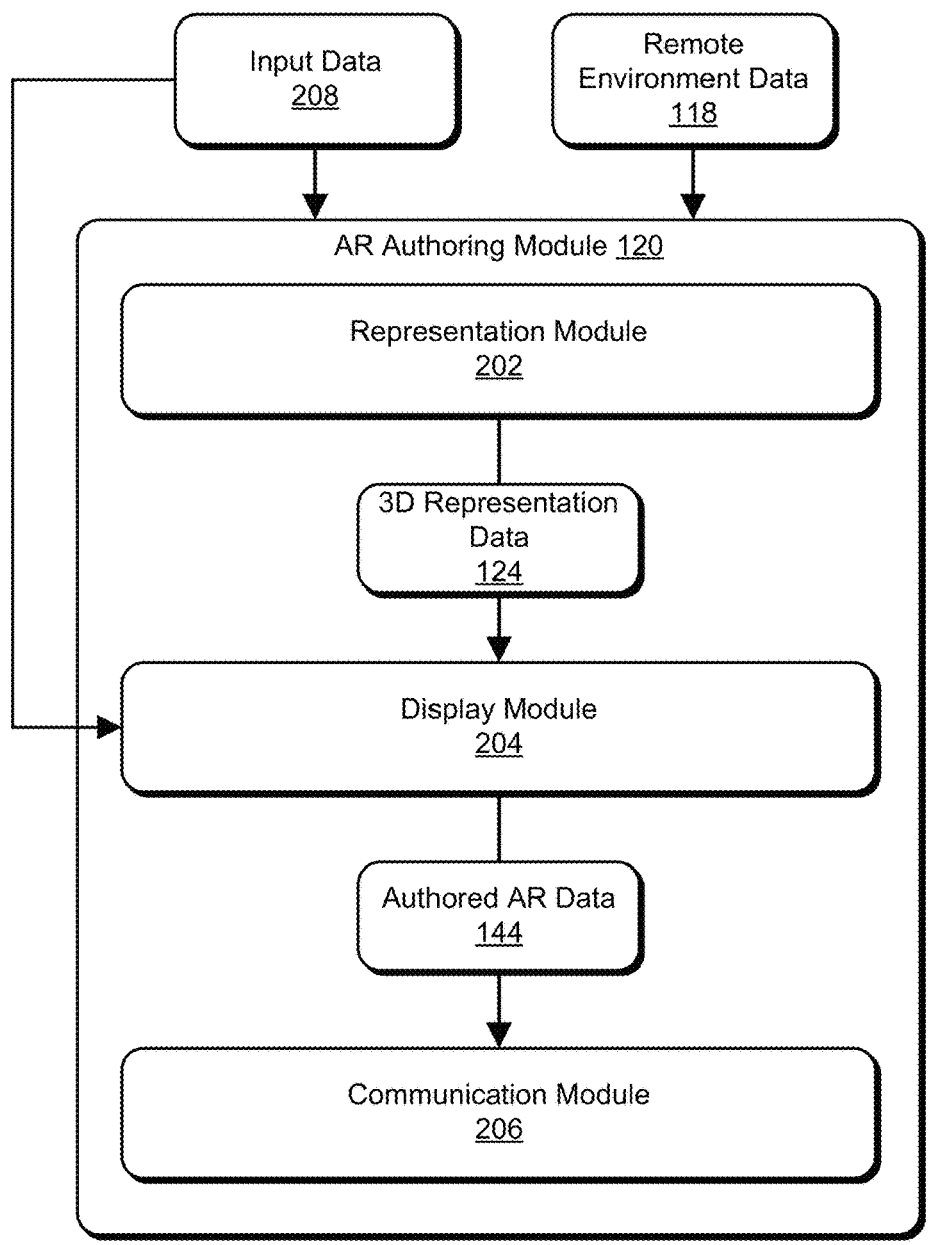
FIG. 2 depicts a system in an example implementation showing operation of an augmented reality authoring module for authoring of remote environments.

FIG. 2 depicts a system 200 in an example implementation showing operation of an augmented reality authoring module 120. The augmented reality authoring module 120 is illustrated to include a representation module 202 which is described in detail with respect to FIGS. 4, 5A, and 5B. The augmented reality authoring module 120 is also illustrated to include a display module 204 and a communication module 206. For example, the augmented reality authoring module 120 receives remote environment data 118 and input data 208. In this example, the representation module 202 receives the remote environment data 118.

Figure 3:
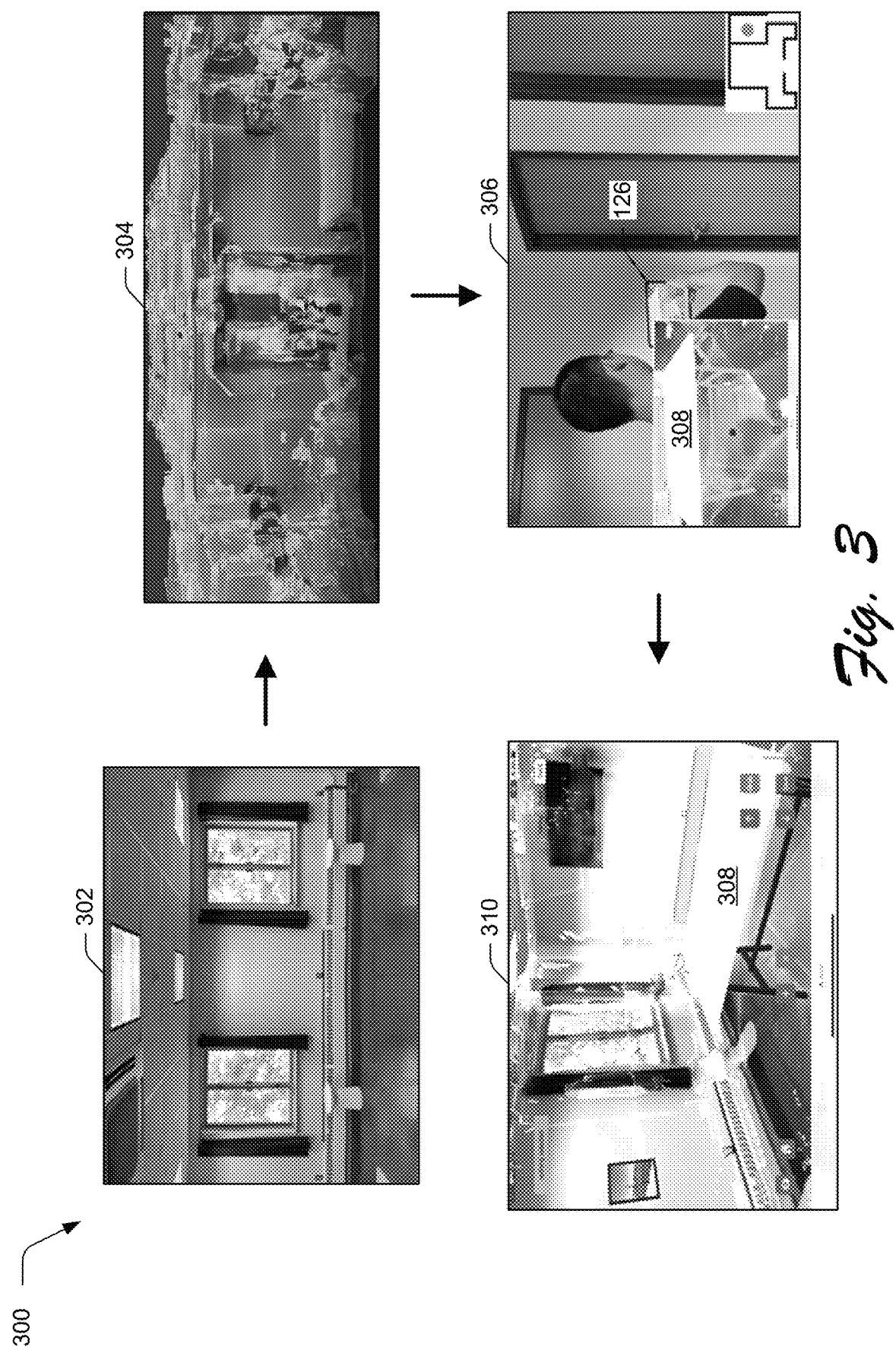
FIG. 3 is an illustration of a representation of augmented reality authoring of a remote physical environment.

FIG. 3 is an illustration of a representation 300 of augmented reality authoring of a remote physical environment. The remote environment data 118 describes a three-dimensional mesh that represents a geometry of the remote physical environment and a digital video frame 302 which depicts a portion of the remote physical environment. As shown in FIG. 3, the digital video frame 302 depicts two windows of the remote physical environment. The remote environment data 118 also describes an orientation and/or a location of an image capture device that captured the digital video frame 302 in the remote physical environment at a time when the image capture device captured the digital video frame 302.

The representation module 202 receives the remote environment data 118 and processes the remote environment data 118 to generate three-dimensional representation data 124. For example, the representation module 202 generates a two-dimensional UV map based on the three-dimensional mesh described by the remote environment data 118. This two-dimensional UV map includes a coordinate in two-dimensions for each vertex of the vertices of the three-dimensional mesh. The three-dimensional mesh is a reconstructed mesh without any texture in one example. The representation module 202 generates the two-dimensional UV map for mapping texture onto the three-dimensional mesh.

To do so, the representation module 202 samples a keyframe from the digital video frames. In one example, the representation module 202 samples a keyframe every 30 digital video frames. In another example, the representation module 202 samples a keyframe at a sample rate which is less than one keyframe every 30 digital video frames or at a sample rate which is greater than one keyframe every 30 digital video frames. For example, the representation module 202 samples different numbers of keyframes based on a number of available digital video frames, a size of the remote physical environment, a complexity of a geometry of the remote physical environment, and so forth.

For each sampled keyframe, the representation module 202 determines parameters such as an orientation of an image capture device that captured the keyframe in the remote physical environment as the image capture device captured the keyframe. The representation module 202 applies these parameters to a virtual camera and aligns a virtual viewport of the virtual camera with the three-dimensional mesh in the orientation of the image capture device that captured the keyframe. By aligning the virtual viewport with the three-dimensional mesh in this manner, the representation module 202 determines a portion of the three-dimensional mesh which corresponds to a portion of the remote physical environment depicted in the keyframe.

The representation module 202 applies color values to the UV map by identifying a vertex of the three-dimensional mesh corresponding to each of the two-dimensional coordinates of the UV map. The representation module 202 determines whether each vertex of the three-dimensional mesh is included in the keyframe by determining whether the vertex is included in a portion of the three-dimensional mesh covered by the virtual viewport of the virtual camera in the orientation of the image capture device that captured the keyframe. If the vertex is included in the keyframe, then the representation module 202 bilinearly interpolates pixel colors in the keyframe and applies a result of the interpolation to the two-dimensional coordinate of the UV map that corresponds to the vertex of the three-dimensional mesh.

The representation module 202 applies the color values to the UV map based on the portion of the three-dimensional mesh covered by the virtual viewport of the virtual camera and the pixel colors depicted in the keyframe to generate a partial texture map that includes colors for the covered portion of the three-dimensional mesh. The representation module 202 repeats this process for each keyframe and generates a plurality of partial texture maps, for example, one partial texture map for each keyframe. In an example, the representation module 202 generates a complete texture map by blending the partial texture maps. For example, the representation module 202 blends the partial texture maps using a pyramid blending technique to generate the complete texture map with smooth borders and avoiding blurring effects caused by averaging. In one example, the representation module 202 generates a six-level image pyramid for each partial texture map and blends the texture maps to generate the complete texture map.

As illustrated in FIG. 3, the representation module 202 applies the complete texture map to the three-dimensional mesh to generate a three-dimensional representation 304 of the remote physical environment. For example, the representation module 202 generates the three-dimensional representation data 124 as describing the three-dimensional representation 304 of the remote physical environment. The display module 204 receives the three-dimensional representation data 124 and displays the three-dimensional representation 304 of the remote physical environment, for example, on the display device 130.

The display module 204 also receives input data 208 which describes a user input 306. For example, a user of the client device 126 interacts with the three-dimensional representation 304 of the remote physical environment via the display device 130 to add a virtual object 308 to the three-dimensional representation 304. In the example shown in FIG. 3, the virtual object 308 is a virtual table which the user of the client device 126 manipulates within the three-dimensional representation 304 of the remote physical environment via the display device 130. The display module 204 receives the three-dimensional representation data 124 and the input data 208 and processes the three-dimensional representation data 124 and/or the input data 208 to generate authored augmented reality data 144. The authored augmented reality data 144 describes a representation 310 of the virtual object 308 added to the three-dimensional representation 304 of the remote physical environment.

The communication module 206 receives the authored augmented reality data 144 and transmits the authored augmented reality data 144 to a remote computing device. For example, the communication module 206 transmits the authored augmented reality data 144 to the remote computing device 106 via the network 104. The remote computing device 106 receives the authored augmented reality data 144 and processes the authored augmented reality data 144 to display the virtual object 308 relative to the remote physical environment 114.

Figure 4:
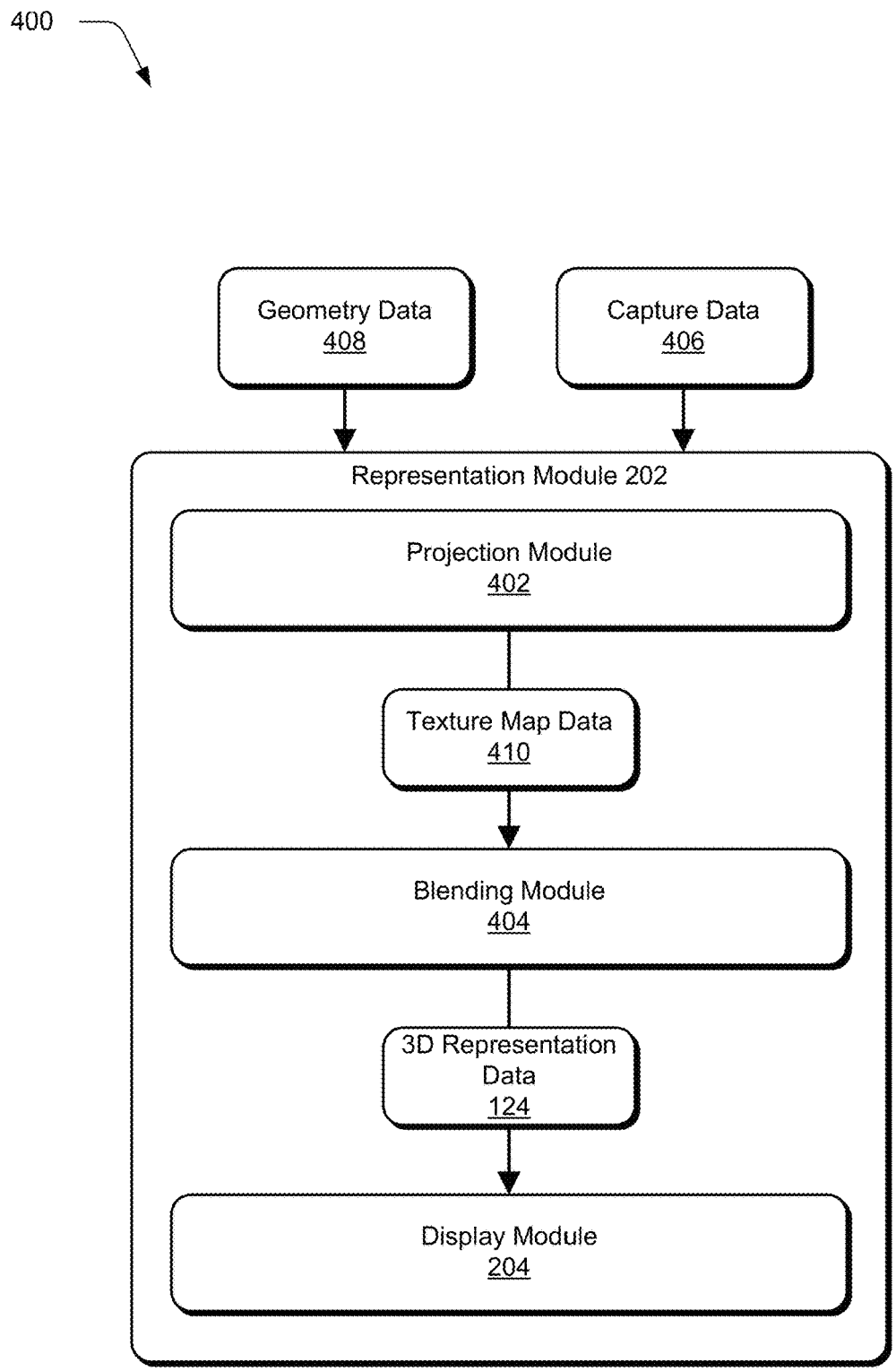
FIG. 4 depicts a system in an example implementation showing operation of a representation module.
Figure 5A:
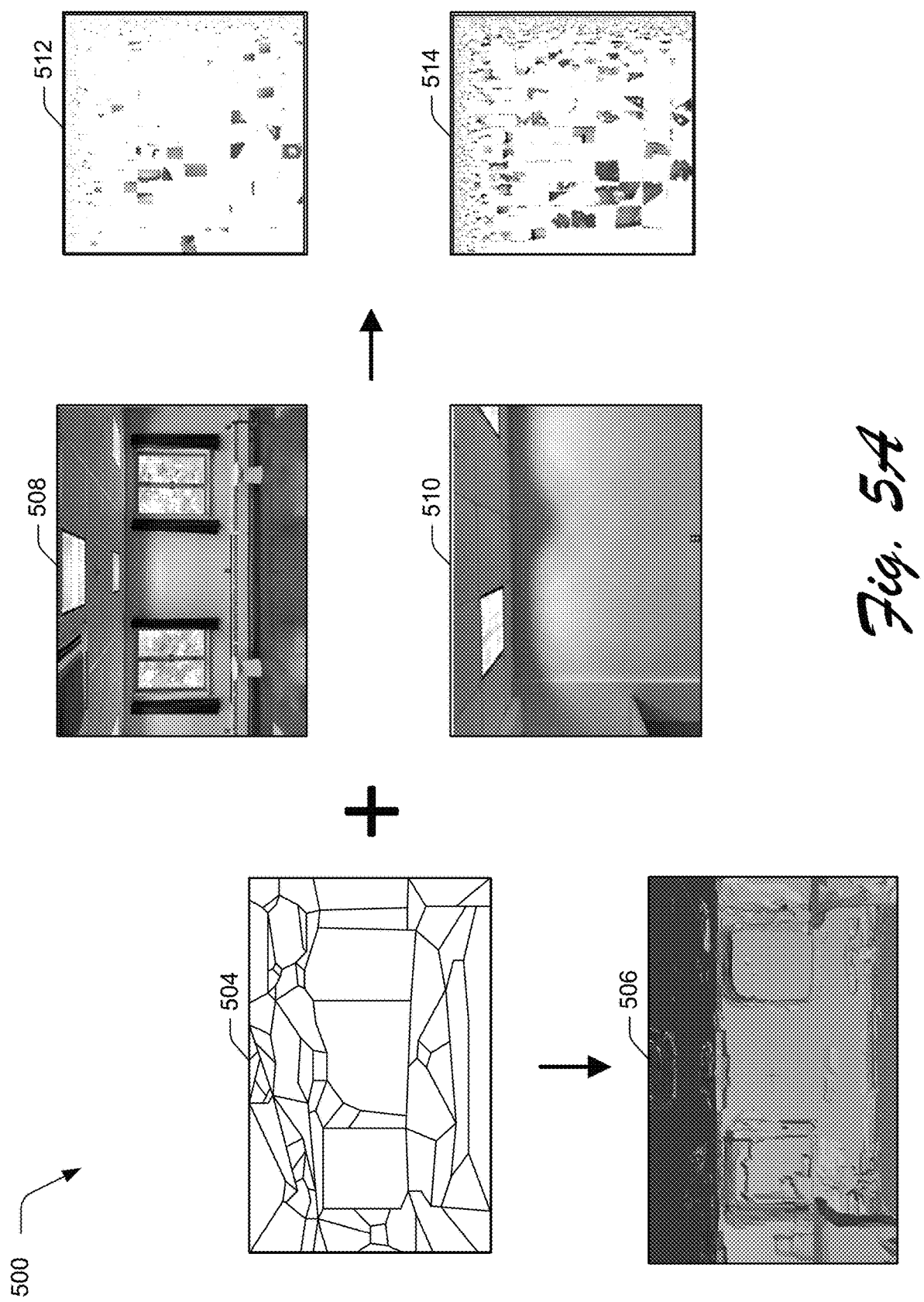
FIGS. 5A and 5B illustrate an example of generating a three-dimensional representation of a remote physical environment.
Figure 5B:
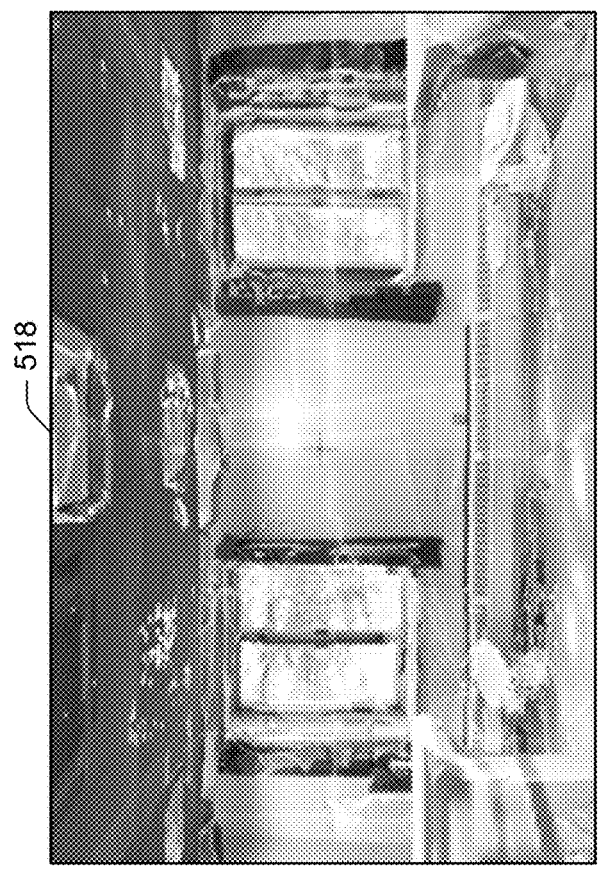
Figure 5B:
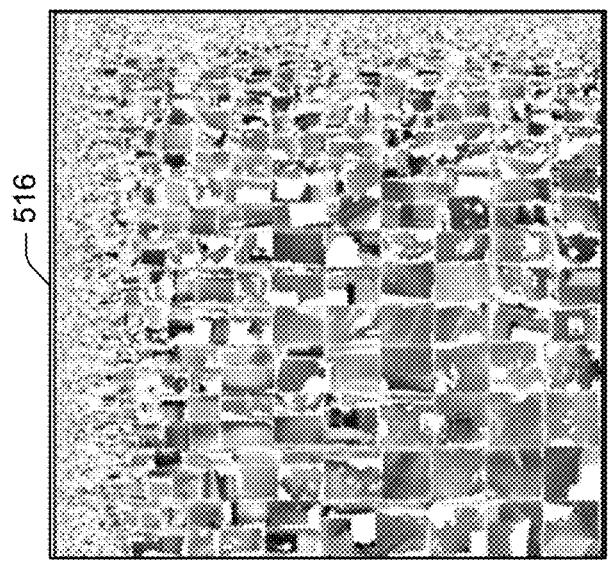

FIG. 4 depicts a system 400 in an example implementation showing operation of a representation module 202. The representation module 202 is illustrated to include a projection module 402 and a blending module 404. FIGS. 5A and 5B illustrate an example of generating a three-dimensional representation of a remote physical environment. FIG. 5A illustrates a representation 500 of generating partial texture maps. FIG. 5B illustrates a representation 502 of generating a complete texture map.

As described with respect to FIG. 2, the representation module 202 receives the remote environment data 118 which includes capture data 406 and geometry data 408. As shown in the representation 500, the geometry data 408 describes a three-dimensional mesh 504 that represents a geometry of the remote physical environment 112. A direct rendering 506 of the three-dimensional mesh 504 without texture is not usable for augmented reality authoring of the remote physical environment 112 in one example. For example, the direct rendering 506 does not include enough context for a user of the client device 126 to visualize and/or author the remote physical environment 112.

The capture data 406 describes digital video frames 508, 510 as well as characteristics of the image capture device 108 corresponding to each of the digital video frames 508, 510. For example, the capture data 406 describes an orientation and/or pose of the image capture device 108 when the image capture device 108 captured the digital video frame 508. In this example, the capture data 406 also describes an orientation and/or pose of the image capture device 108 when the image capture device 108 captured the digital video frame 510.

The projection module 402 receives the capture data 406 and the geometry data 408 and processes the capture data 406 and/or the geometry data 408 to generate texture map data 410. To do so in one example, the projection module 402 generates a two-dimensional UV map that includes a coordinate in two-dimensions for each vertex of the vertices of the three-dimensional mesh 504. For example, the projection module 402 generates the two-dimensional UV map for mapping texture onto the three-dimensional mesh 504.

The projection module 402 applies the orientation and/or pose of the image capture device 108 when the image capture device 108 captured the digital video frame 508 to a virtual viewport of a virtual camera directed at the three-dimensional mesh 504. By aligning the virtual viewport with the three-dimensional mesh 504 in this manner, the projection module 402 determines a portion of the three-dimensional mesh 504 which corresponds to a portion of the remote physical environment 112 depicted in the digital video frame 508. For example, the projection module 402 identifies vertices included in the determined portion of three-dimensional mesh 504 and applies color values to the two-dimensional coordinates of the of the UV map that correspond to the identified vertices.

In one example, the projection module 402 applies the color values to the two-dimensional coordinates of the UV map by bilinearly interpolating pixel colors in the digital video frame 508 and mapping a result of the interpolation to the two-dimensional coordinates of the UV map to generate a partial texture map 512. For example, the projection module 402 repeats the same process for the digital video frame 510 to generate a partial texture map 514. In this example, the projection module 402 applies the orientation and/or pose of the image capture device 108 when the image capture device 108 captured the digital video frame 510 to the virtual viewport of the virtual camera directed at the three-dimensional mesh 504. The projection module 402 then determines a portion of the three-dimensional mesh 504 which corresponds to a portion of the remote physical environment 112 depicted in the digital video frame 510.

Continuing this example, the projection module 402 determines vertices included in the determined portion of the three-dimensional mesh 504 and two-dimensional coordinates of the UV map corresponding the determined vertices. The projection module 402 bilinearly interpolates pixel colors of the digital video frame 510 and maps the interpolated pixel colors to the coordinates of the UV map to generate the partial texture map 512. The projection module 402 generates the texture map data 410 as describing the partial texture maps 512, 514.

The blending module 404 receives the texture map data 410 and processes the texture map data 410 to generate the three-dimensional representation data 124. For example, the blending module 404 uses a pyramid blending technique to blend the partial texture maps 512, 514 into a complete texture map 516. In one example, the blending module 404 generates a six-level image pyramid for each of the partial texture maps 512, 514 and blends these to generate the complete texture map 516. As shown in FIG. 5B, the complete texture map 516 has smooth borders and does not include blurring effects caused by averaging. The blending module 404 generates the three-dimensional representation data 124 as describing the three-dimensional mesh 504 and the complete texture map 516.

The display module 204 receives the three-dimensional representation data 124 and processes the three-dimensional representation data 124 to generate the three-dimensional representation 304 of the remote physical environment. For example, the three-dimensional representation 304 includes a view 518 within the three-dimensional representation 304 which is a same view as depicted in the direct rendering 506. It is not clear what part of the remote physical environment 112 is depicted in the direct rendering 506; however, it is clear from the view 518 that the square like shapes depicted in the direct rendering are windows of the remote physical environment 112. For example, a user of the client device 126 generates the authored augmented reality data 144 by interacting with the view 518 to add the virtual object 308 to the three-dimensional representation 304 of the remote physical environment.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 6:
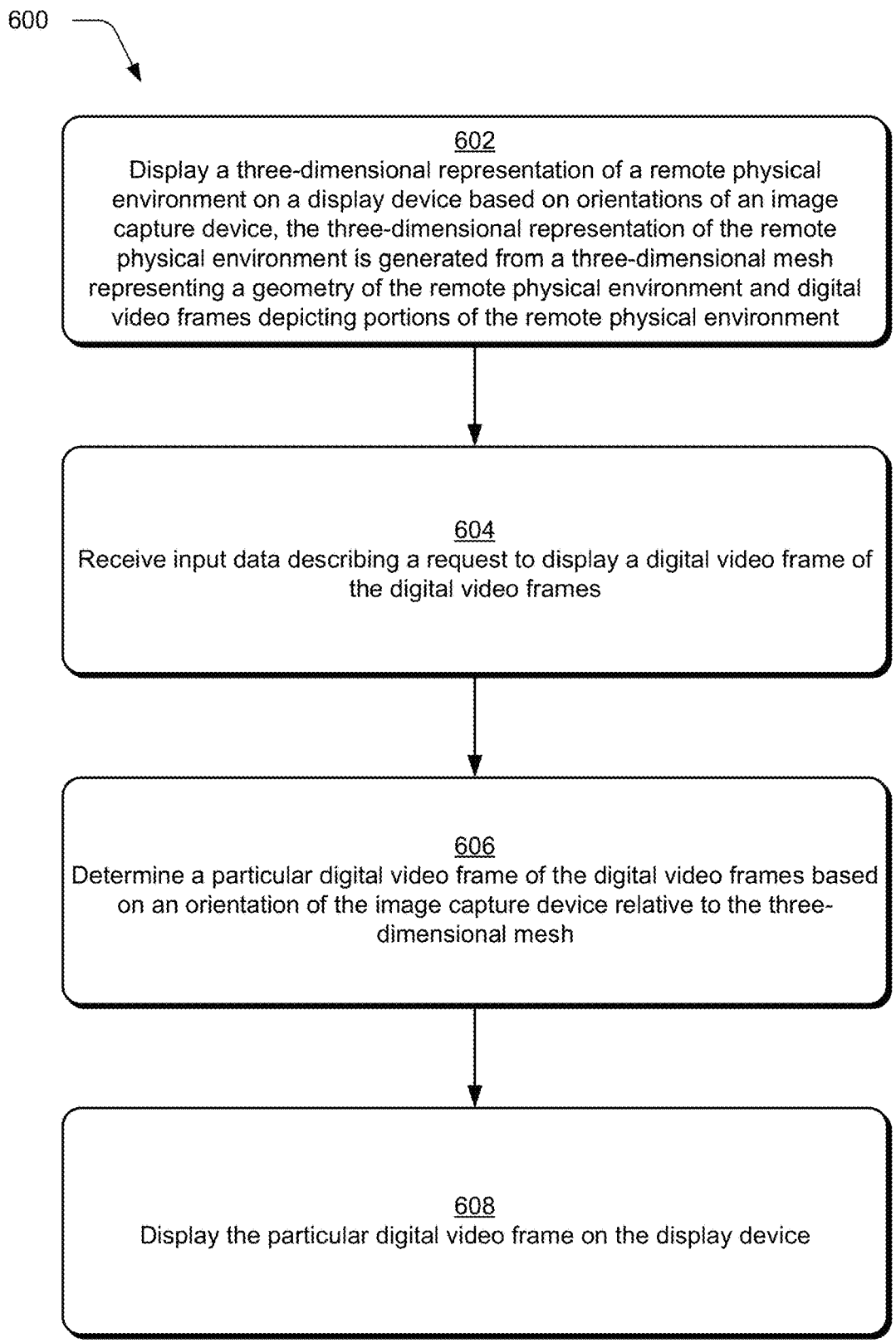
FIG. 6 is a flow diagram depicting a procedure in an example implementation in which a particular digital video frame of digital video frames used to generate a three-dimensional representation of a remote physical environment is displayed on a display device.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which a particular digital video frame of digital video frames used to generate a three-dimensional representation of a remote physical environment is displayed on a display device.

A three-dimensional representation of a remote physical environment is displayed on a display device based on orientation of an image capture device (block 602), the three-dimensional representation of the remote physical environment is generated based on a three-dimensional mesh representing a geometry of the remote physical environment and digital video frames depicting portions of the remote physical environment. The computing device 102 implements the augmented reality authoring module 120 to display the three-dimensional representation of the remote physical environment in one example. Input data describing a request to display a digital video frame of the digital video frames is received (block 604). For example, the augmented reality authoring module 120 receives the input data describing the request. A particular digital video frame of the digital video frames is determined based an orientation of the image capture device relative to the three-dimensional mesh (block 606). In one example, the computing device 102 implements the augmented reality authoring module 120 to determine the particular digital video frame. The particular digital video frame is displayed on the display device (block 608). The computing device 102 implements the augmented reality authoring module 120 to display the particular digital video frame on the display device in this example.

Figure 7B:
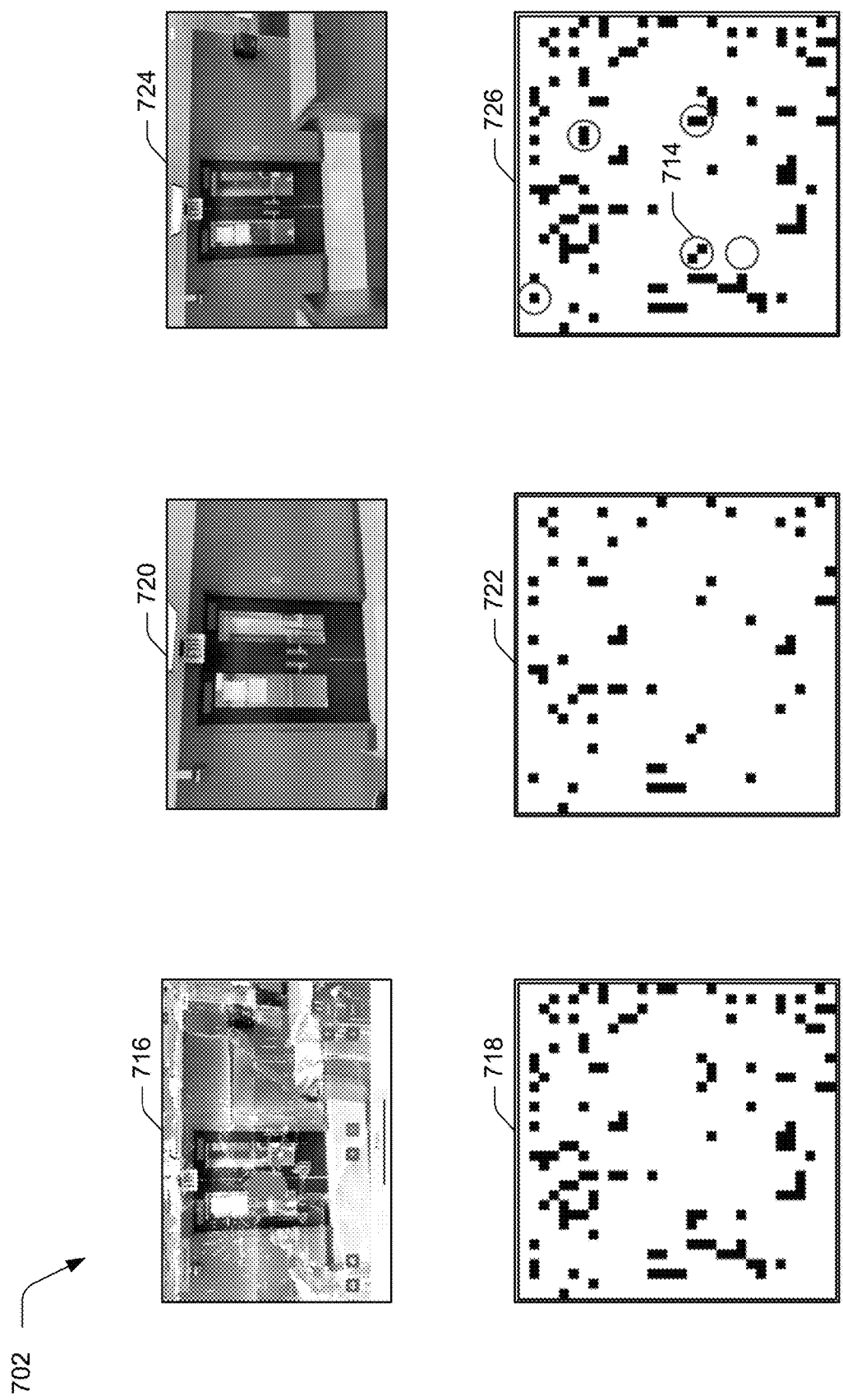
Figure 7C:

FIGS. 7A, 7B, and 7C illustrate an example of determining a particular digital video frame of digital video frames used to generate a three-dimensional representation of a remote physical environment for display on a display device. FIG. 7A illustrates a representation 700 of determining overlaps between coverage of a three-dimensional mesh by an image capture device of a computing device displaying the three-dimensional representation and coverages of the three-dimensional mesh by an image device that captured the particular digital video frame of the digital video frames. FIG. 7B illustrates a representation 702 in which the particular digital video frame is determined by comparing coverage maps of the image capture device and the image capture device that captured two particular digital video frames of the digital video frames. FIG. 7C illustrates a representation 704 of displaying the particular digital video frame as a photorealistic composite.

As shown in FIG. 7A, the representation 700 includes the three-dimensional mesh 504 and an image capture device 706 of a computing device displaying the three-dimensional representation 304 of the remote physical environment. The image capture device 706 is the image capture device 128 in one example. An orientation of a viewport of the image capture device 706 covers a portion 708 of the three-dimensional mesh 504. In one example, the portion 708 corresponds to a user's view of the three-dimensional representation 304 of the remote physical environment.

The representation 700 also includes an image capture device 710 that captured the digital video frames. For example, the image capture device 710 is the image capture device 108. The augmented reality authoring module 120 uses recorded orientations of the image capture device 710 when the image capture device 710 captured each of the digital video frames to determine a portion 712 of the three-dimensional mesh 504 covered when the image capture device 710 captured a particular digital video frame of the digital video frames. The augmented reality authoring module 120 determines an overlap 714 between the portion 708 and the portion 712. For example, the augmented reality authoring module 120 determines which digital video frame of the digital video frames is most similar to the user's view in the three-dimensional representation 304 of the remote physical environment. The overlap 714 is an indication of this similarity in one example.

As illustrated in FIG. 7B, the representation 702 includes a rendering 716 of the user's view in the three-dimensional representation 304 of the remote physical environment. For example, the rendering 716 corresponds to the portion 708 and the augmented reality authoring module 120 generates a UV coverage map 718 for the portion 708. In one example, the augmented reality authoring module 120 generates the coverage map 718 in substantially real time in response to receiving input data describing a request to display a digital video frame corresponding to the rendering 716.

The representation 702 also includes a digital video frame 720 which has a corresponding UV coverage map 722 as well as a digital video frame 724 which is illustrated to have a corresponding UV coverage map 726. In one example, the augmented reality authoring module 120 generates a coverage map for every digital video frame included in the remote environment data 118. For example, the augmented reality authoring module 120 compares the coverage map 718 to coverage maps of every digital video frame included in the remote environment data 118. In another example, the augmented reality authoring module 120 identifies a subset of all of the digital video frames for comparison. In this example, the augmented reality authoring module 120 identifies the subset based on a view angle of the image capture device 706 and a view angle of the image capture device 710.

Continuing this example, the augmented reality authoring module 120 identifies the subset as having a smallest difference between the view angles. In the illustrated example, this subset includes the digital video frames 720, 724. The augmented reality module 120 compares the UV coverage map 722 to the UV coverage map 718 and also compares the UV coverage map 726 to the UV coverage map 718. The augmented reality module 120 determines that the digital video frame 724 is a most similar digital video frame to the rendering 716 based on overlap 714 between the UV coverage map 718 and the UV coverage map 726. For example, the UV coverage map 726 has more overlap 714 with the UV coverage map 718 than the UV coverage map 722 has with the UV coverage map 718.

The augmented reality authoring module 120 displays the digital video frame 724 as a photorealistic composite 728 which is included in the representation 704. For example, the augmented reality authoring module 120 displays the photorealistic composite 728 on the display device 130. This allows a user of the client device 126 to view a photorealistic representation of the rendering 716. For example, if the user of the client device 126 is uncertain of what is depicted in the rendering 716, then the photorealistic composite 728 clarifies the uncertainty.

Figure 8:
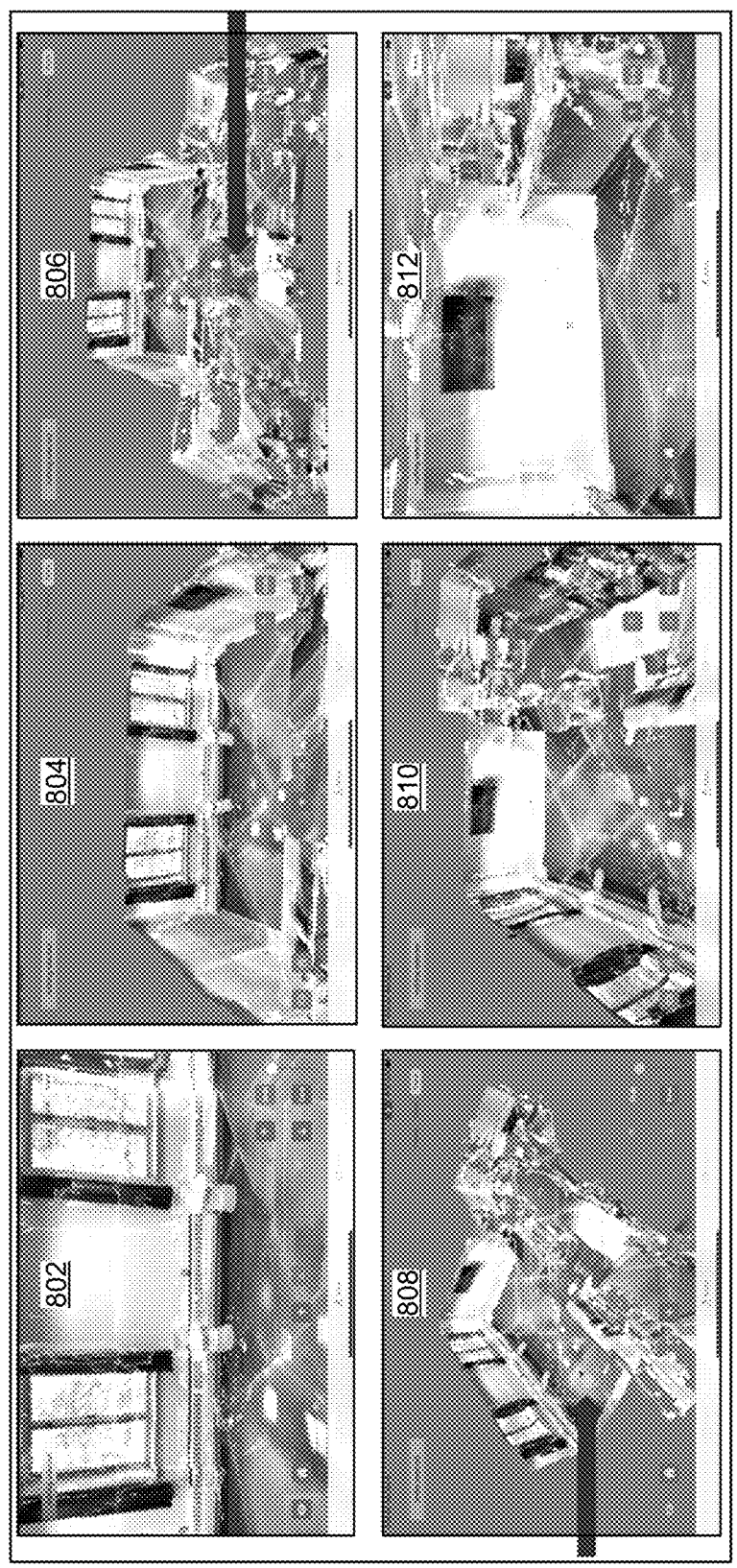
FIG. 8 illustrates an example representation of a user interface for displaying a complete view of a three-dimensional representation of a remote physical environment.

FIG. 8 illustrates an example representation 800 of a user interface for displaying a complete view of a three-dimensional representation of a remote physical environment. As shown, the representation 800 includes a first view 802 within the three-dimensional representation 304 of the remote physical environment. For example, a user of the client device 126 views the first view 802 on the display device 130. In this example, the augmented reality authoring module 120 determines the first view 802 for display on the display device 130 based on an orientation of the image capture device 128 relative to the three-dimensional mesh 504.

The augmented reality authoring module 120 receives input data describing a request to display a complete view of the three-dimensional representation 304 of the remote physical environment. In one example, the user of the client device 126 interacts with the display device 130 to generate the input data. Responsive to receiving the input data describing the request, the augmented reality authoring module 120 causes the display device 130 to display a second view 804 which is an intermediate view of a gradual transition away from the first view 802. For example, the augmented reality authoring module 120 causes the display device 130 to display the second view 804 as part of a series of intermediate views of the three-dimensional representation 304 which appear to zoom out from the first view 802 to a third view 806.

The third view 806 is a complete view of the three-dimensional representation 304 of the remote physical environment. A location of the client device 126 (e.g., and the user of the client device 126) within the three-dimensional representation 304 is indicated by an arrow in the third view 806. For example, the user of the client device 126 interacts with the display device 130 to rotate the complete view of the three-dimensional representation 304 and indicate a different location within the three-dimensional representation 304.

The augmented reality authoring module 120 causes the display device 130 to display a fourth view 808 which depicts the rotated complete view of the three-dimensional representation 304. As shown, the different location is indicated by an arrow in the fourth view 808. The augmented reality authoring module 120 causes the display device 130 to display series of intermediate views of the three-dimensional representation 304 which appear to zoom in from the fourth view 808 to the different location. For example, this series of intermediate views includes a fifth view 810 which is an intermediate view of a gradual transition away from the fourth view 808.

Finally, the augmented reality authoring module 120 causes the display device 130 to display a sixth view 812. The sixth view 812 is a view of the three-dimensional representation 304 of the physical environment at the different location within the three-dimensional representation 304. For example, the display device 130 displays the sixth view 812 based on an orientation of the image capture device 128 relative to the three-dimensional mesh 504. In this example, the augmented reality authoring module 120 changes the location of the client device 126 relative to the three-dimensional mesh 504 from the location of the client device 126 indicated in the third view 806 to the different location.

By changing the location of the client device 126 relative to the three-dimensional mesh 504 in this way, the augmented reality authoring module 120 enables a user of the client device 126 to view different portions of the three-dimensional representation 304 without needing to physically move the client device 126 and the image capture device 128 within the physical environment 132. This is because physical movement in the physical environment 132 is restricted, e.g., by the physical objects 134, 136. For example, the user of the client device 126 interacts with the display device 130 to add the virtual object 142 to the three-dimensional representation 304 at the different location within the three-dimensional representation 304 of the remote physical environment 112.

Interface Mode Examples

In some examples, a user of the client device 126 interacts with the display device 130 to interact with the three-dimensional representation 304 of the remote physical environment in a portal mode, a dollhouse mode, and/or a peek mode. In an example of the portal mode, the user of the client device 126 moves the image capture device 128 in the physical environment 132 and the augmented reality authoring module 120 causes the display device 130 to display the three-dimensional representation 304 based on these movements. In an example of the dollhouse mode, the user of the client device 126 interacts with the three-dimensional representation 304 as described with respect to FIG. 8. In an example of the peek mode, the user of the client device 126 interacts with the three-dimensional representation as described with respect to FIGS. 7A, 7B, and 7C.

Example System and Device

Figure 9:
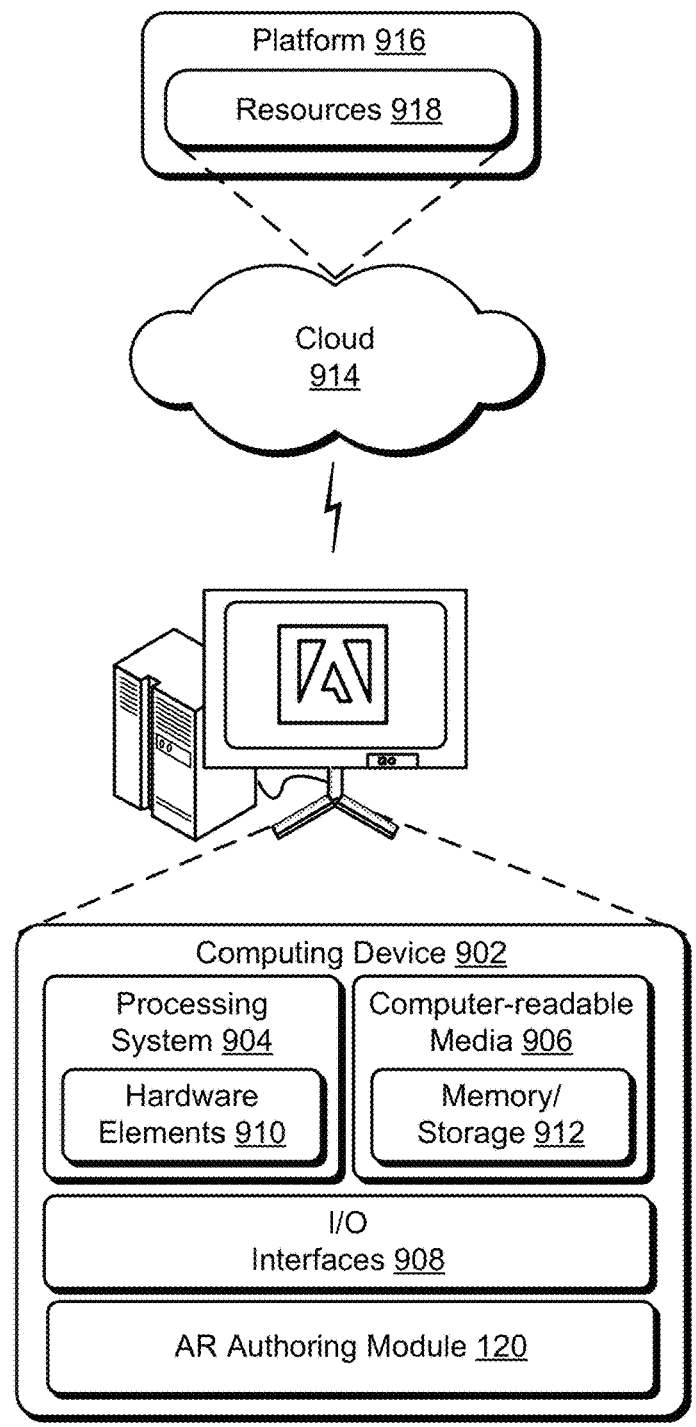
FIG. 9 illustrates an example system that includes an example computing device that is representative of one or more computing systems and/or devices for implementing the various techniques described herein.

FIG. 9 illustrates an example system 900 that includes an example computing device that is representative of one or more computing systems and/or devices that are usable to implement the various techniques described herein. This is illustrated through inclusion of the augmented reality authoring module 120. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are be configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage component 912 includes volatile media (such as random access memory (RAM)) and/or nonvolatile media (such as read only memory (ROM), Flash memory, optical disks, magnetic disks, and so forth). In another example, the memory/storage component 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for augmented reality authoring of remote environments have been described in language specific to structural features and/or methods, it is to be understood that the appended claims are not necessarily limited to the specific features or methods described. Rather, the specific features and methods are disclosed as example implementations of systems for augmented reality authoring of remote environments, and other equivalent features and methods are intended to be within the scope of the appended claims. Further, various different examples are described and it is to be appreciated that each described example is implementable independently or in connection with one or more other described examples.

What is claimed is:

1. A method comprising:
   displaying, by a display device of a processing device, a three-dimensional representation of a remote physical environment based on orientations of an image capture device of the processing device not located in the remote physical environment, the three-dimensional representation generated by applying a texture map to a three-dimensional mesh representing a geometry of the remote physical environment, the texture map generated by blending partial texture maps associated with digital video frames depicting portions of the remote physical environment using a pyramid blending technique that includes generating an image pyramid for each respective partial texture map and blending the image pyramids;
   receiving, by the processing device, input data describing a request to display a digital video frame of the digital video frames;
   determining, by the processing device, a particular digital video frame of the digital video frames by comparing a coverage map based on an orientation of the image capture device relative to the three-dimensional mesh with two or more coverage maps of a different image capture device that captured the digital video frames relative to the three-dimensional mesh; and
   displaying, by the processing device, the particular digital video frame on the display device.

2. The method as described in claim 1, further comprising determining overlaps between coverage of the three-dimensional mesh by the coverage map based on the orientation of the image capture device of the processing device and coverages of the three-dimensional mesh by the two or more coverage maps of the different image capture device that captured the digital video frames.

3. The method as described in claim 2, further comprising determining a most similar coverage map of the two or more coverage maps of the image capture device that captured the digital video frames relative to the three-dimensional mesh to the coverage map based on the orientation of the image capture device of the processing device relative to the three-dimensional mesh.

4. The method as described in claim 1, wherein the image capture device that captured the digital video frames is an image capture device of a remote processing device.

5. The method as described in claim 1, further comprising displaying a virtual object relative to the particular digital video frame on the display device.

6. The method as described in claim 5, wherein the virtual object and the particular digital video frame are displayed as a photorealistic composite.

7. The method as described in claim 1, further comprising:
   receiving additional input data describing a request to display a complete view of the three-dimensional representation of the remote physical environment;
   displaying the complete view of the three-dimensional representation of the remote physical environment on the display device; and
   displaying an indication of a position and orientation of the processing device relative to the three-dimensional representation of the remote physical environment on the display device.

8. A system comprising:
a memory component; and
a processing device coupled to the memory component, the processing device to perform operations comprising:
  receiving remote environment data describing a three-dimensional mesh representing a geometry of a remote physical environment, digital video frames depicting portions of the remote physical environment, and orientations of an image capture device that captured the digital video frames;
  generating partial texture maps for each frame of the digital video frames that include colors for areas of the three-dimensional mesh by bilinearly interpolating pixel colors of the digital video frames and applying a result of the interpolation to a two-dimensional UV map, the UV map based on the three-dimensional mesh;
  generating a three-dimensional representation of the remote physical environment by applying a texture map to the three-dimensional mesh, the texture map generated by blending the partial texture maps;
  displaying the three-dimensional representation of the remote physical environment on a display device of the processing device based on orientations of an image capture device of the processing device;
  receiving input data describing a request to display a digital video frame of the digital video frames;
  determining a particular digital video frame of the digital video frames by comparing a coverage map based on an orientation of the image capture device of the processing device relative to the three-dimensional mesh with two or more coverage maps associated with two or more of the digital video frames; and
  displaying the particular digital video frame on the display device.

9. The system as described in claim 8, the operations further comprising displaying a virtual object relative to the particular digital video frame on the display device.

10. The system as described in claim 8, wherein the three-dimensional representation of the remote physical environment is displayed based on movements of the image capture device of the processing device.

11. The system as described in claim 8, the operations further comprising:
  receiving additional input data describing a request to display a complete view of the three-dimensional representation of the remote physical environment;
  displaying the complete view of the three-dimensional representation of the remote physical environment on the display device; and
  displaying an indication of a position of the processing device relative to the three-dimensional representation of the remote physical environment on the display device.

12. The system as described in claim 11, the operations further comprising displaying an indication of an orientation of the processing device relative to the three-dimensional representation of the remote physical environment on the display device.

13. The system as described in claim 8, wherein the UV map is a two-dimensional UV map generated based on the three-dimensional mesh, the UV map including two-dimensional coordinates for vertices of the three-dimensional mesh.

14. The system as described in claim 8, the operations further comprising generating a coverage map for each of the digital video frames included in the remote environment data.

15. The system as described in claim 8, the operations further comprising generating a subset of digital video frames based on a view angle of the image capture device and a view angle of a different image capture device that captured the digital video frames, and generating coverage maps for each of the digital video frames included in the subset of digital video frames.

16. A non-transitory computer-readable storage medium storing executable instructions, which when executed by a processing device, causes the processing device to perform operations including:
  displaying a three-dimensional representation of a remote physical environment on a display device based on orientations of an image capture device, the three-dimensional representation generated by applying a texture map to a three-dimensional mesh representing a geometry of the remote physical environment, the texture map generated by blending partial texture maps associated with digital video frames depicting portions of the remote physical environment, the partial texture maps generated by bilinearly interpolating pixel colors of the digital video frames;
  receiving input data describing a request to display a digital video frame of the digital video frames;
  determining a particular digital video frame of the digital video frames by comparing a coverage map based on an orientation of the image capture device of the processing device relative to the three-dimensional mesh with two or more coverage maps associated with two or more of the digital video frames captured by an image capture device of a remote processing device; and
  displaying the particular digital video frame on the display device as a photorealistic composite, the photorealistic composite including a rendering of the three-dimensional representation combined with the particular digital video frame.

17. The non-transitory computer-readable storage medium as described in claim 16, wherein the operations further include displaying a virtual object relative to the particular digital video frame on the display device.

18. The non-transitory computer-readable storage medium as described in claim 16, wherein determining the particular digital video frame includes comparing the coverage map based on the orientation of the image capture device of the processing device relative to the three-dimensional mesh with coverage maps generated for each digital video frame of the digital video frames to determine a most similar coverage map, the most similar coverage map corresponding to the particular digital video frame.

19. The non-transitory computer-readable storage medium as described in claim 16, further comprising determining a subset of digital video frames based on a view angle of the image capture device of the processing device and one or more view angles of the image capture device that captured the digital video frames, and wherein determining the particular digital video frame includes comparing the coverage map based on the orientation of the image capture device of the processing device relative to the three-dimensional mesh with one or more coverage maps of each digital video frame of the subset of digital video frames to determine a most similar coverage map.

20. The non-transitory computer-readable storage medium as described in claim 19, wherein the subset of digital video frames is based on a smallest difference between the view angle of the image capture device of the processing device and the one or more view angles of the image capture device that captured the digital video frames.

* * * * *